US008052081B2

(12) United States Patent
Olm et al.

(10) Patent No.: US 8,052,081 B2
(45) Date of Patent: Nov. 8, 2011

(54) DUAL ROTOR HELICOPTER WITH TILTED ROTATIONAL AXES

(75) Inventors: Orville Olm, Saskatoon (CA); Greg Wood, Saskatoon (CA); Zenon Dragan, Saskatoon (CA)

(73) Assignee: Draganfly Innovations Inc., Saskatoon, Saskatchewan (CA)

( * ) Notice: Subject to any disclaimer, the term of this patent is extended or adjusted under 35 U.S.C. 154(b) by 187 days.

(21) Appl. No.: 12/458,608

(22) Filed: Jul. 16, 2009

(65) Prior Publication Data

US 2010/0108801 A1   May 6, 2010

Related U.S. Application Data

(63) Continuation-in-part of application No. 12/230,119, filed on Aug. 22, 2008.

(51) Int. Cl.
*B64C 27/08* (2006.01)
(52) U.S. Cl. .................................... 244/17.23
(58) Field of Classification Search ............. 244/17.19, 244/17.21, 17.23, 17.25, 3.27, 3.28, 3.29; 416/128, 129, 130, 142, 143, 124, 125; 446/37; D12/328
See application file for complete search history.

(56) References Cited

U.S. PATENT DOCUMENTS

| | | | | |
|---|---|---|---|---|
| 2,695,674 A * | 11/1954 | Kaman et al. | | 416/115 |
| 3,241,791 A * | 3/1966 | Piasecki | | 244/17.19 |
| 5,791,592 A * | 8/1998 | Nolan et al. | | 244/17.11 |
| 7,210,651 B2 * | 5/2007 | Scott | | 244/17.13 |
| 2005/0067527 A1 * | 3/2005 | Petersen | | 244/17.11 |
| 2006/0049304 A1 | 3/2006 | Sanders, Jr. et al. | | |
| 2009/0250549 A1 * | 10/2009 | Wiggerich | | 244/17.11 |

FOREIGN PATENT DOCUMENTS

WO   2006/112578   10/2006
WO   2008/000203   1/2008

OTHER PUBLICATIONS

Boeing CH-47 Chinook—Wikipedia Article, 19 Pages (http://en.wikipedia.org/wiki/Boeing_CH-47_Chinook).*
Boeing CH-47 Chinook—Wikipedia Article, 19 Pages (http://en.wikipedia.org/wiki/Boeing_CH-47_Chinook), Jun. 13, 2007.*
U.S. Appl. No. 12/230,119, filed Aug. 22, 2008; Dragan et al.

* cited by examiner

*Primary Examiner* — Timothy D Collins
*Assistant Examiner* — Jamie S Stehle
(74) *Attorney, Agent, or Firm* — Nixon & Vanderhye P.C.

(57) ABSTRACT

A rotary wing aircraft apparatus includes a body and a rotor pair connected to the body by an arm. The rotor pair has an upper rotor driven by an upper motor and rotating about an upper rotor axis and a lower rotor driven by a lower motor and rotating about a lower rotor axis. The upper and lower rotor axes are tilted with respect to each other. Tilting the axes away from the arm increases the distance from the rotor blades to the arm, and decreases the risk of the blades of the rotor contacting the arm. In an aircraft with a plurality of arms extending from the body, and a rotor assembly connected to each arm, the arms can be pivoted from a flying position, where the arms extend laterally outward to a folded position where the arms are positioned substantially parallel and adjacent to each other.

21 Claims, 12 Drawing Sheets

DUAL ROTOR HELICOPTER WITH TILTED ROTATIONAL AXES

This application is a continuation-in-part and claims priority to U.S. application Ser. No. 12/230,119, filed 22 Aug. 2008, the entire contents of which is hereby incorporated by reference.

This invention is in the field of rotary wing aircrafts or helicopters and more particularly rotary wing aircrafts with upper and lower rotors.

BACKGROUND

Helicopters using horizontal rotors have been known for a long time. They allow an aircraft to move vertically (allowing vertical take-offs), hover in the air, move side to side, etc. The use of horizontal rotors gives helicopters an unprecedented amount of movement in relation to a fixed wing craft.

However, conventional helicopters are typically very complex. Most conventional helicopters use a large horizontal rotor for lift and a smaller vertical rotor (the tail rotor) to counterbalance torque imposed on the helicopter by the rotation of the large lift rotor. By altering the pitch of the blades of the small vertical rotor, the entire helicopter can be pivoted from side to side or held straight.

The horizontal rotor must also be specially designed to cause the helicopter to tilt in different directions when required and to control the amount of lift created by the rotors. In one common conventional system, a swash plate assembly, comprising a fixed swash plate and a rotating swash plate, is used to change the pitch angle of the rotor blades. The swash plate assembly can be used in two ways: to change the pitch angle of all of the rotor blades collectively; or, by changing the pitch angle of the rotor blades individually and cyclically as they revolve. By changing the pitch angle of all of the rotor blades collectively, the amount of lift generated by the helicopter can be increased or decreased causing the helicopter to ascend or descend, respectively. By changing the pitch angle of the rotor blades cyclically as they revolve, the lift created on one side of the rotor can be increased causing the helicopter to tilt in a desired direction and thereby move in the direction the helicopter is tilting.

Tandem coaxial rotors have been developed to avoid the use of a smaller vertically mounted rotor. A pair of horizontal rotors rotating in opposite directions around a single axis are used. The counter-rotating pair of horizontal rotor blades can be used to balance out the torque created around the single axis by each of the two rotors and by altering the speeds of the two rotors relative to each other, the helicopter can be yawed left or right around the axis shared by the rotors.

While these tandem coaxial rotors remove the necessity for a tail rotor (vertical rotor) to counterbalance the rotational forces placed on a helicopter by a single rotor, to achieve all the desired movements of a conventional helicopter helicopters with tandem coaxial rotors have increased the mechanical complexity of the rotor systems. Rather than in more conventional systems which use two swashplates in the swashplate assembly to change the pitch of the rotor blades, tandem coaxial rotors typically use two swashplates for each rotor requiring four swashplates to be needed. In addition, provisions typically have to be made for the control system of the upper rotor to pass through the lower rotor control system.

While some remote controlled helicopters such as toys and drones have used simple versions of tandem coaxial rotor systems, they have often sacrificed the range of producible movements in order to reduce the mechanical complexity of the rotor system.

It is desirable in many applications to have a helicopter that can achieve all the movements of a conventional helicopter with a reduced mechanical complexity. It is also desirable to have a helicopter that can be folded into a relatively compact form for transport.

SUMMARY OF THE INVENTION

It is an object of the present invention to provide a rotary wing aircraft apparatus with upper and lower rotors that overcomes problems in the prior art.

The invention provides, in a first embodiment, a rotary wing aircraft apparatus comprising a body and a rotor pair connected to the body by an arm. The rotor pair comprising an upper rotor driven by an upper motor and rotating about an upper rotor axis and a lower rotor driven by a lower motor and rotating about a lower rotor axis. The upper and lower rotor axes are tilted with respect to each other. Tilting the axes away from the arm increases the distance from the rotor blades to the arm, and decreases the risk of the blades of the rotor contacting the arm.

The invention provides, in a second embodiment, a rotary wing aircraft apparatus comprising a body, a plurality of arms extending laterally from the body, and a rotor assembly connected to an outside end of each arm. The arms are connected to the body such that the arms can be pivoted from a flying position, where the arms extend laterally outward from the body such that the rotor assemblies are spaced in a desired configuration, to a folded position where the arms are positioned substantially parallel and adjacent to each other. The folded aircraft is comparatively compact and easier to transport, and in the compact form the aircraft is less susceptible to damage.

In one embodiment the aircraft has two forward arms supporting rotor arms that can be folded to lie adjacent to a rear extending arm supporting a coaxial rotor pair. In this position, the aircraft can be loaded into a pneumatic cannon or other propulsion device and quickly launched to a desired altitude where the forward arms will rotate forward and the aircraft can be flown starting from the desired altitude.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
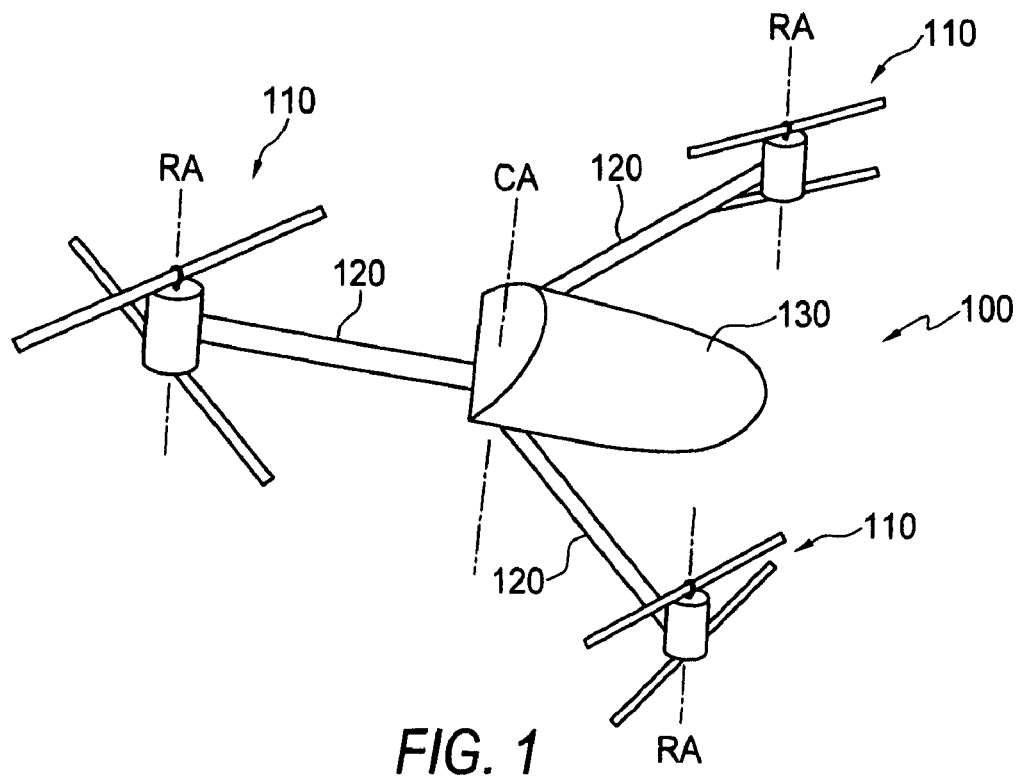
FIG. 1 is perspective view of an aircraft.
Figure 2:
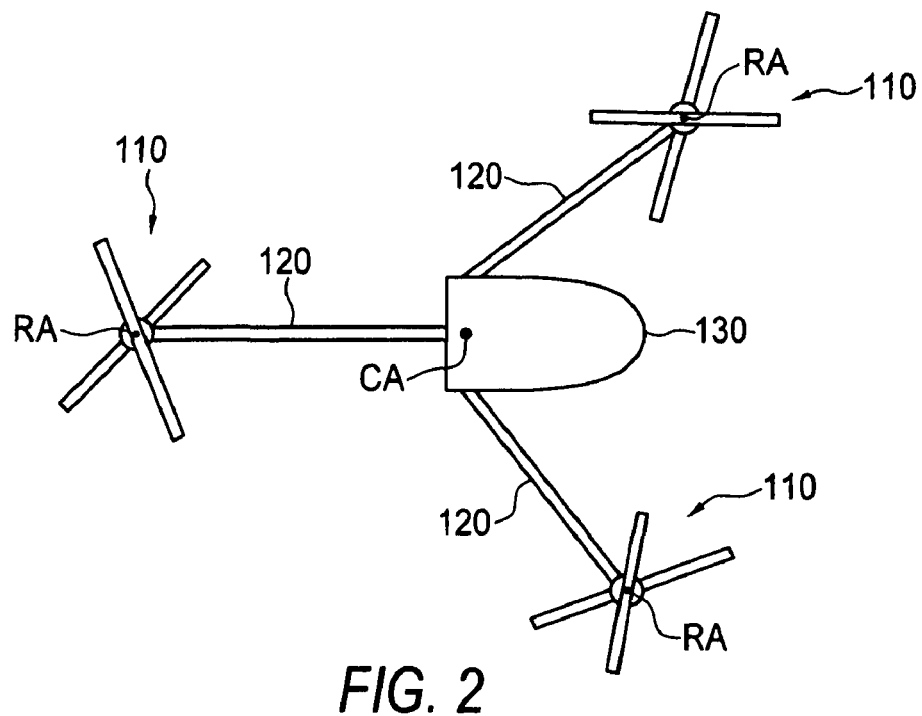
FIG. 2 is a top view of the aircraft shown in FIG. 1.

FIGS. 1 and 2 illustrate an aircraft 100 with three coaxial rotor pairs 110. Using the three coaxial rotor pairs 110, aircraft 100 is capable of performing the maneuvers a typical conventional helicopter is capable of, yet does not require the mechanical complexity of a typical conventional helicopter and all of the coaxial rotor pairs 110 can be used to create lift.

Each of the rotor pairs 110 are positioned at the end of an arm 120 connected to a main body 130 of the aircraft 100. In an aspect, the arms 120 are positioned extending at regular intervals around a central axis, CA, with each arm 120 positioning the rotor pair 110 attached to the end of the arm 120 the same distance away from the central axis, CA, as the other rotor pairs 110 and with each arm 120 positioned so the rotor pairs 110 are positioned at the corners of an equilateral triangle, as illustrated in the top view of FIG. 2.

Figure 3:
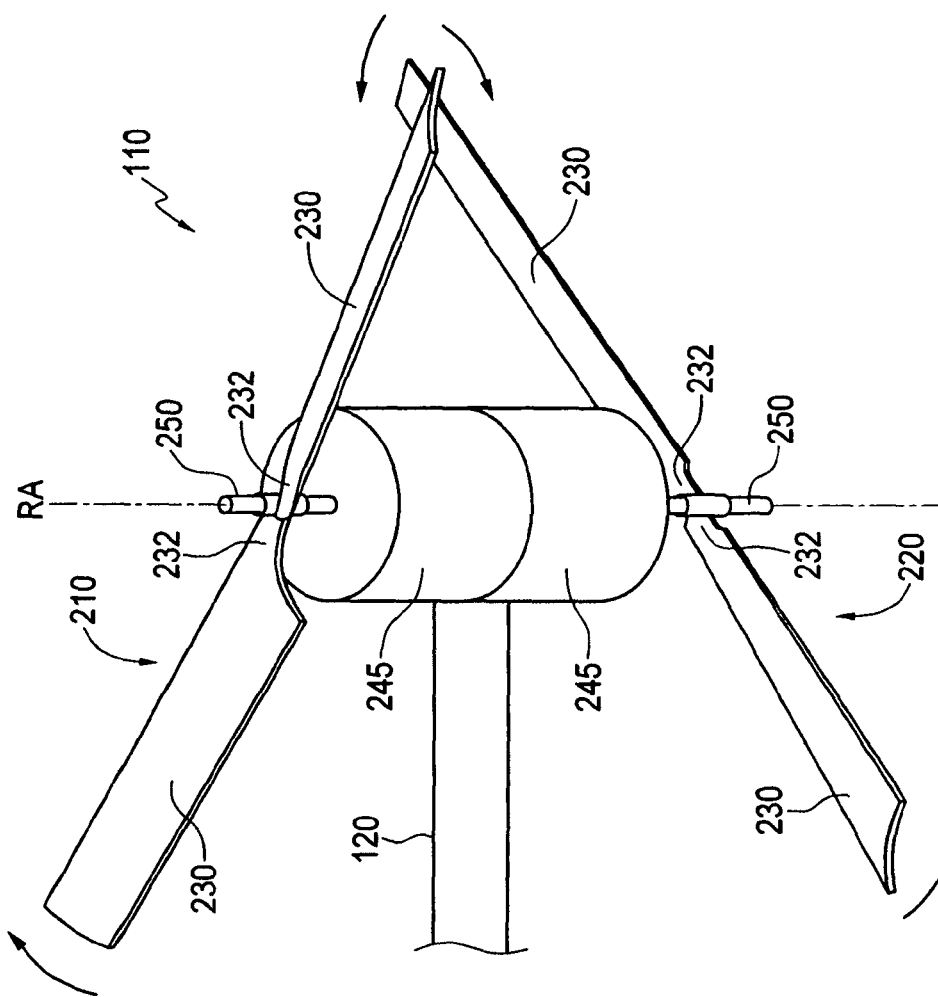
FIG. 3 is a perspective view of one rotor pair of the aircraft shown in FIG. 1.

FIG. 3 illustrates a perspective view of one of the rotor pairs 110. The rotor pair 110 has an upper rotor 210 and a lower rotor 220. The upper rotor 210 and lower rotor 220 each have two rotor blades 230 that rotate around a rotor axis, RA.

In operation, when the upper rotor 210 and lower rotor 220 are rotated to generate lift, the upper rotor 210 and lower rotor 220 rotate in opposite directions around the shared rotor axis, RA. The rotation of the upper rotor 210 around the rotor axis, RA, causes the rotor pair 110 to want to rotate around the rotor axis, RA. However, the counter-rotation of the lower rotor 220 around the rotor axis, RA, causes the rotor pair 110 to want to rotate in the opposite direction around the rotor axis, RA. By altering the speeds of rotation of the upper rotor 210 and the lower rotor 220 and changing the rotational speed differential between the upper rotor 210 and the lower rotor 220, the rotational forces created by the rotating upper rotor 210 and lower rotor 220 can be balanced or used to create a torque effect in a desired direction around the rotor axis, RA.

Particularly when the aircraft 100 is a small remote control aircraft, such as toys, hobby devices or unmanned drones, each upper rotor 210 and lower rotor 220 can be independently driven by its own electric motor 245 with the upper rotor 210 attached to the output shaft 250 of the electric motor 245 and the lower rotor 220 attached to the output shaft 250 of the electric motor 245. The speed of the upper rotor 210 and lower rotor 220 can be varied independently of the each other by varying the current being directed to the corresponding electric motor 245.

Figure 4:
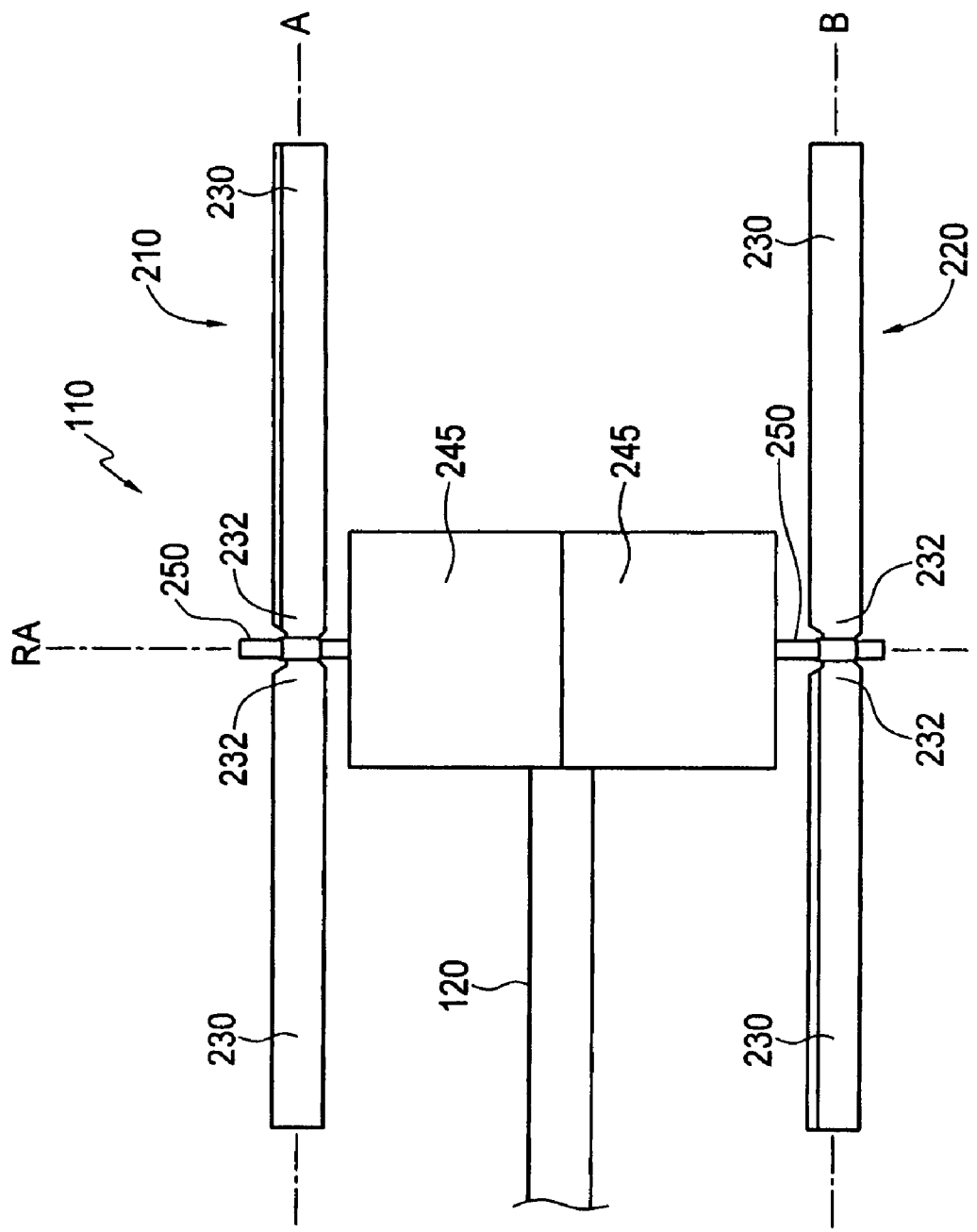
FIG. 4 is a side view of the rotor pairs shown in FIG. 3.

FIG. 4 illustrates a side view of a rotor pair 110. First ends 232 of the rotor blades 230 making up the upper rotor 210 and lower rotor 220 are fixedly connected to shafts 250 running along the rotor axis, RA, causing the rotor blade 230 to remain substantially perpendicular to the rotor axis, RA, when the shafts 250 are rotated. When the aircraft 100 is at rest on the ground, the rotor blades 230 are positioned substantially horizontally.

When the aircraft 100 is in flight, the upper rotor 210 rotates through a first plane, A that is substantially perpendicular to the rotor axis, RA, and the lower rotor 220 rotates through a second plane, B that is also substantially perpendicular to the rotor axis, RA causing planes A and B defined by the rotating upper rotor 210 and lower rotor 220, respectively, to remain substantially parallel to each other.

Figure 5:
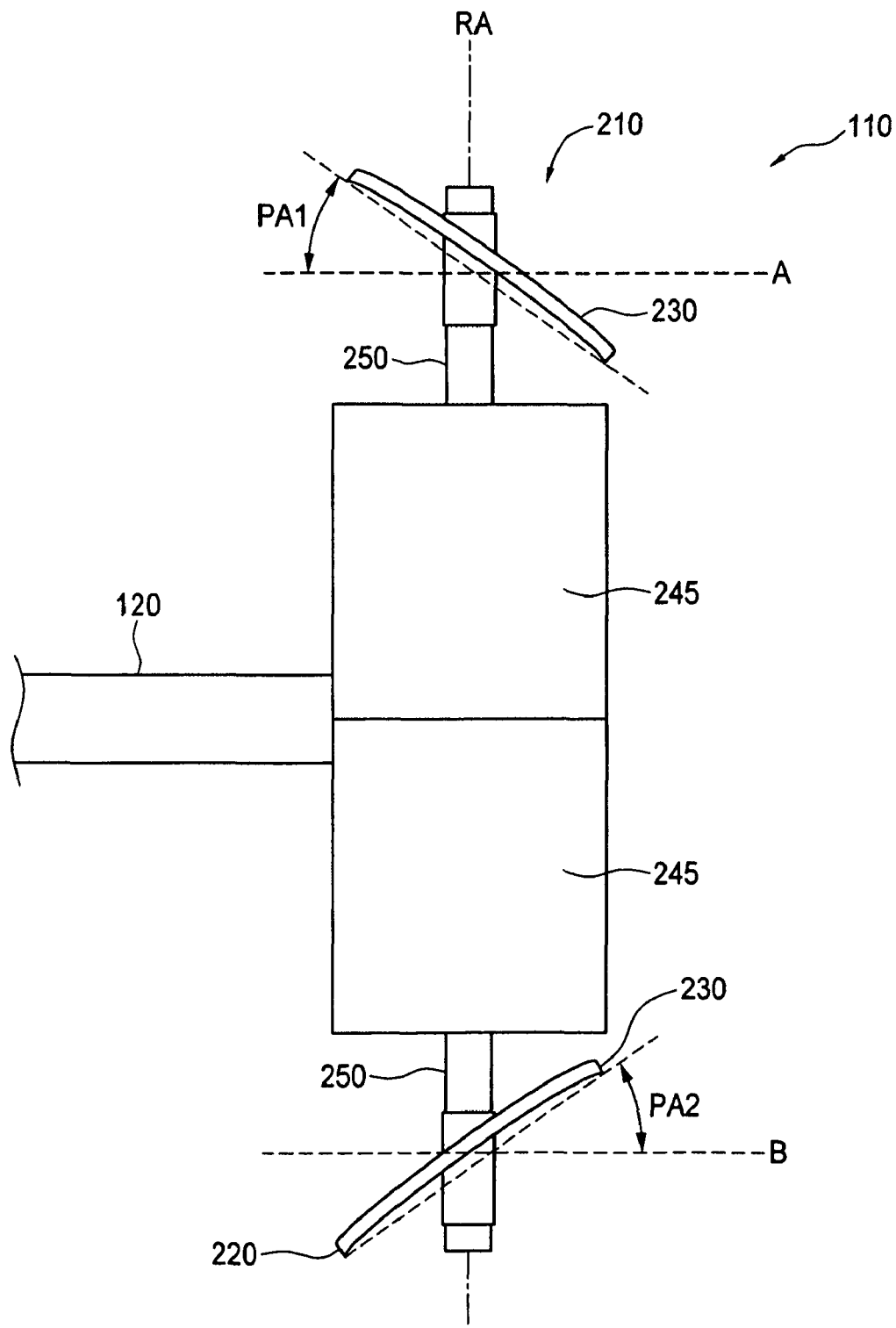
FIG. 5 is a side view of the rotor pair shown in FIG. 3 with the rotor blades turned to show the pitch angle of the rotor blades.

FIG. 5 illustrates a side view of a rotor pair 110. In an aspect, a pitch angle PA1 of the rotor blades 230 of the upper rotor 210 and a the pitch angle PA2 of the rotor blades 230 of the lower rotor 220 remain fixed relative to the rotor axis, RA.

In an aspect, the rotor blades 230 are sufficiently rigid so that they will not bend or twist when the aircraft 110 is in flight.

Referring again to FIGS. 1 and 2, the fixed upper rotors 210 and fixed lower rotors 220 allow the aircraft 100 to be manufactured with very few moving parts yet still maintain all of the movements of conventional helicopters. Rather than having a number of varying mechanical linkages connecting each of the rotors to vary the pitch angle of the rotor blades or the pitch of the rotors, only the electric motors 245 are moving with the upper rotors 210 and the lower rotors 220 rigidly connected to output shafts 250 of the electric motors 245.

The aircraft 100 can increase or decrease altitude by increasing or decreasing the speed of rotation of all of the upper rotors 210 and all of the lower rotors 220 at the same time. By increasing the speed of rotation of all of the upper rotors 210 and all of the lower rotors 220 the lift generated by all of the rotor pairs 110 is increased and the aircraft 100 can be made to rise vertically. Additionally, by decreasing the speed of rotation of all of the upper rotors 210 and all of the lower rotors 220, the altitude of the aircraft 100 can be decreased. In this manner, all six rotors making up the rotor pairs 100 can be used to generate vertical lift with none of the engine(s) capacity being directed to horizontal rotors.

The aircraft 100 can also be moved horizontally in any direction. To move the aircraft 100 in a desired horizontal direction, the speed of rotation of one or more rotor pairs 110 on a side of the aircraft 100 facing the desired direction are decreased or the speed of rotation of the other rotor pairs 110 can be increased. This will cause the aircraft 100 to tilt towards the desired direction of travel, tilting all of the upper rotors 210 and all of the lower rotors 220 downwards towards the desired direction and creating some horizontal thrust. This horizontal thrust causes the aircraft 100 to move in the desired direction. The more the one or two rotor pairs 110 are slowed or the more the other rotor pair(s) 110 speed of rotation is increased, the greater the tilt of the aircraft 110 and the faster the aircraft 100 will travel in the desired direction.

The aircraft 100 can be yawed so that it rotates around the central axis, CA, either to the right or to the left by decreasing the speed of rotation of the upper rotors 210 and lower rotors 220 rotating opposite to the desired direction of yaw, increasing the speed of rotation of the upper rotors 210 and lower rotors 220 rotating in the desired direction of yaw or both decreasing the speed of rotation of the upper rotors 210 and lower rotors 220 rotating opposite the desired direction of yaw and increasing the speed of rotation of the upper rotors 210 and lower rotors 220 rotating in the desired direction of yaw.

In this manner, the aircraft 100 can be made to rise, descent, travel in any horizontal direction and yaw right or left in the same manner as a conventional helicopter without requiring the complex mechanical linkages required in a conventional helicopter.

Figure 6:
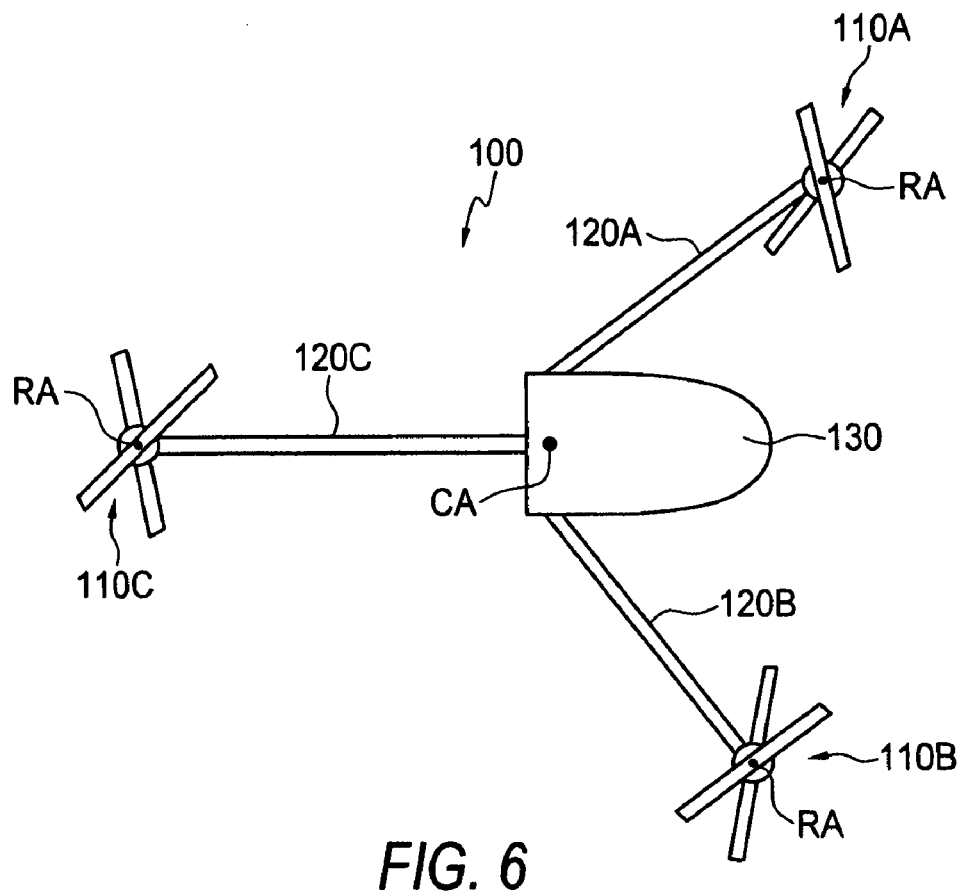
FIG. 6 is a schematic top view of an aircraft in a flying position in another aspect.
Figure 7:
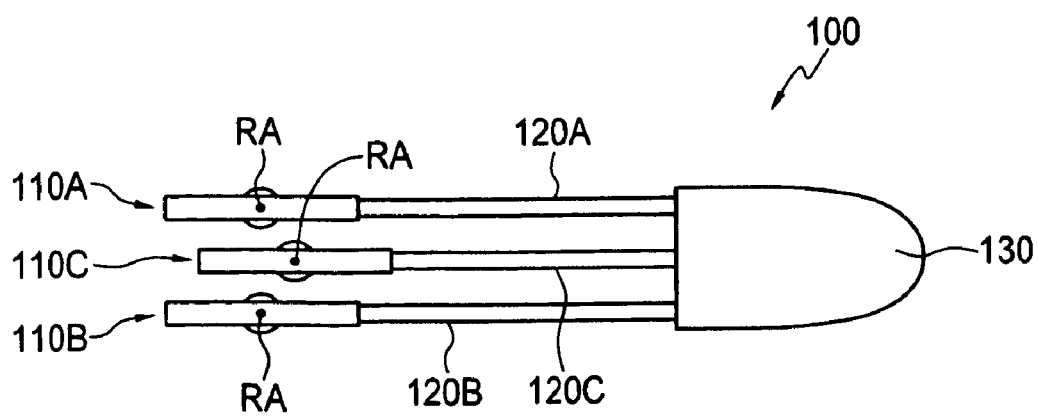
FIG. 7 is a schematic top view of the aircraft of FIG. 6 in a folded position.

FIGS. 6 and 7 illustrate the aircraft 100 in a further aspect. The aircraft 100 has a body 130, and a plurality of arms 120 extending laterally from the body 130, and a rotor pair 110 connected to an outside end of each arm 120. The arms 120 are connected to the body 130 such that the arms 120 can be pivoted from a flying position illustrated in FIG. 6, where the arms 120 extend laterally outward from the body 130 such that the rotor pairs 110 are spaced in a desired configuration, to a folded position illustrated in FIG. 7 where the arms 120 are positioned substantially parallel and adjacent to each other.

While the illustrated aircraft 100 uses rotor pairs 110 as illustrated with upper and lower rotor 210, 220, it is also contemplated that an aircraft using a rotor assembly with only a single rotor mounted on the arms 120 could also utilize the folding arm feature of the present invention.

Aircraft 100 has two arms 120A, 120B supporting rotor pairs 110A, 110B extending to the sides and slightly forward of the body 130 of the aircraft 100 and arm 120C supporting rotor pair 110C extending to the rear of the body 130. The two front arms 120A, 120B supporting rotor pairs 110A, 110B are pivotally attached to the body 130 of the aircraft 100 and the ends of the arms 120A, 120B opposite to the ends supporting the rotor pairs 110A, 110B, so that the front arms 120A, 120B can be pivoted rearwards of the body 130 of the aircraft 100 so that the arms 120A, 120B are positioned adjacent the rear extending arm 120C, as shown in FIG. 7. The rotor blades 230 can then be rotated so that they run substantially parallel to the arms 120A, 120B, and 120C.

FIGS. 8-11 illustrate one folding mechanism for folding the arms 120 together. The body 130 is shown in phantom lines. A clip bracket 161 is fixed to the inner end of arm 120C and a resilient clip 163 is mounted on each end of the clip bracket 161.

Figure 8:
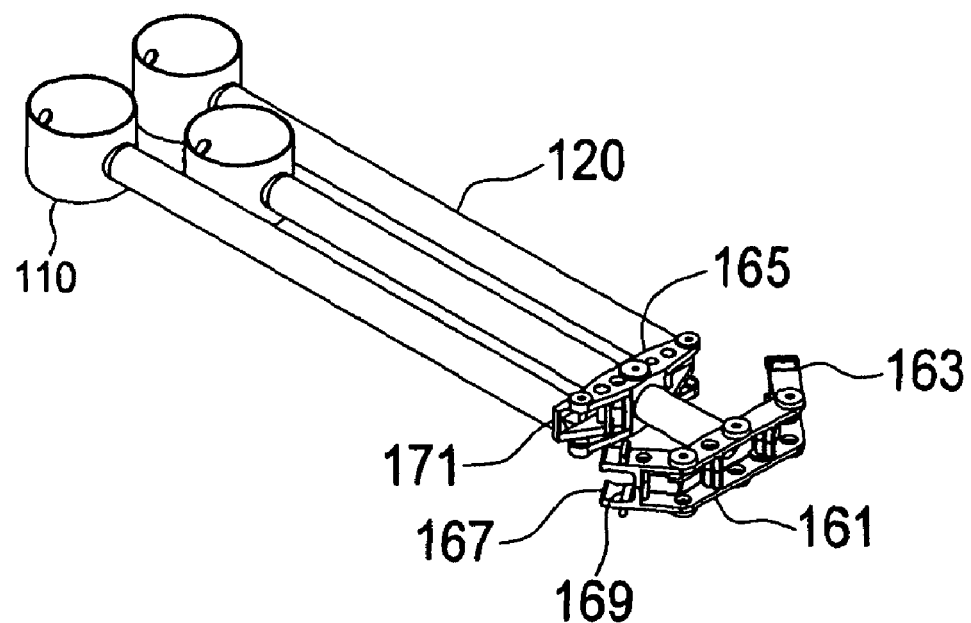
FIG. 8 is a perspective view of a mechanism for folding the arms of the aircraft, with the arms in the folded position.
Figure 9:
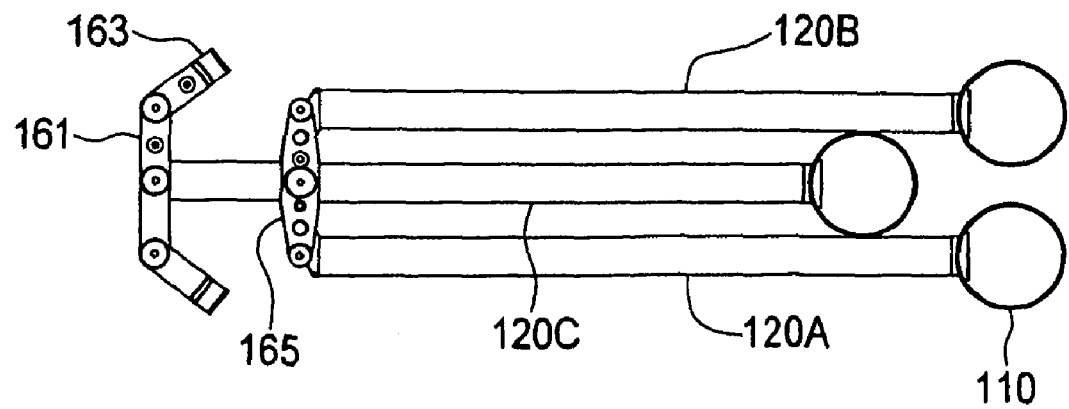
FIG. 9 is a top view of the mechanism of FIG. 8, with the arms in the folded position.
Figure 10:
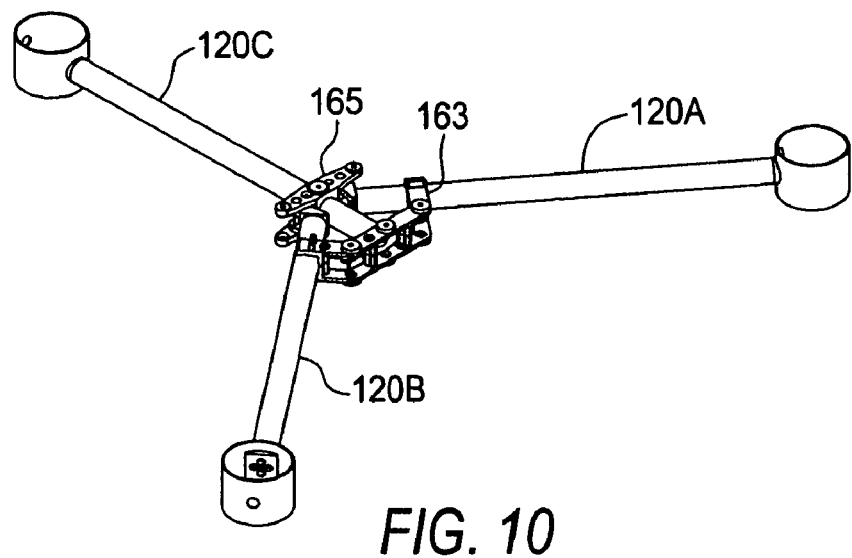
FIG. 10 is a perspective view of the mechanism of FIG. 8, with the arms in the flying position.
Figure 11:
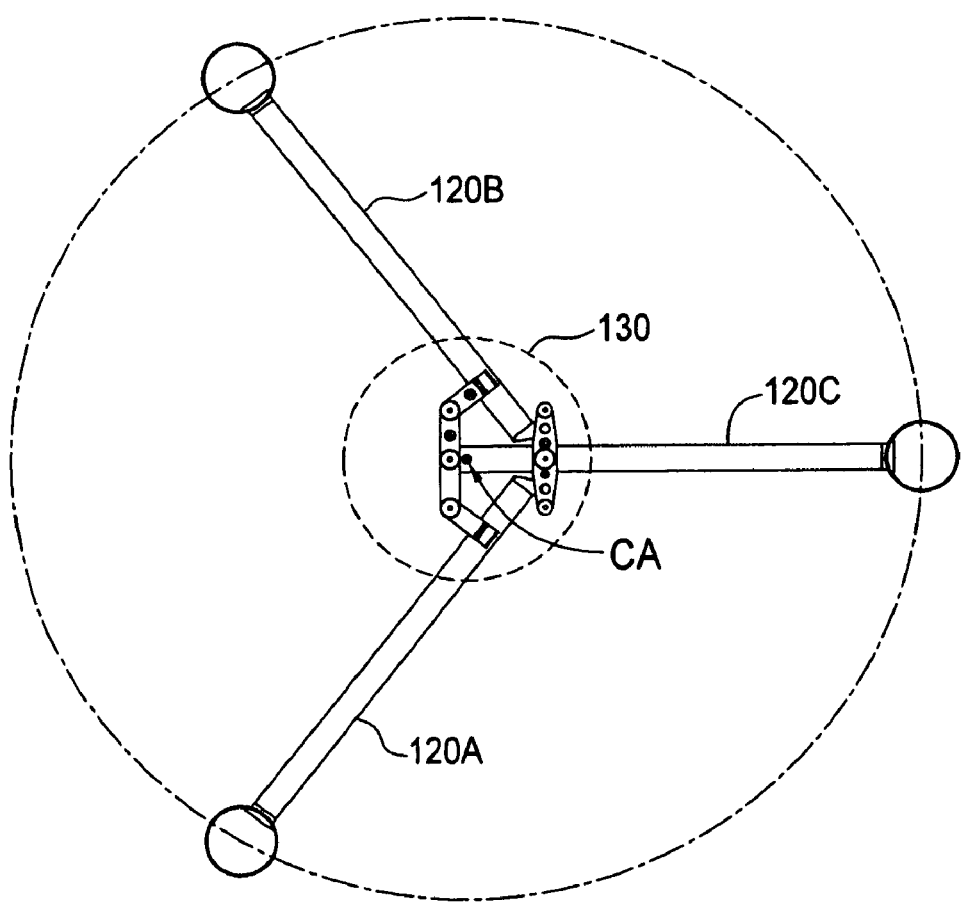
FIG. 11 is a top view of the mechanism of FIG. 8, with the arms in the flying position.

The arms 120A, 120B are pivotally attached at their inner ends to opposite ends of a pivot bracket 165 attached to the arm 120C a short distance from the clip bracket 161. The clips 163 and pivot bracket 165 are configured such that the arms 120 can fold together as illustrated in FIGS. 8 and 9 for storage, and such that the arms 120A, 120B can be pivoted outward to ward their corresponding clips 163A, 163B. The arms can be pushed into the clips 163 to open the clips and allow the arms 120 to fully engage the clips 163, which will then close and lock the arms 120A, 120B in the position illustrated in FIGS. 10 and 11.

Although it is contemplated that other clip configurations could be used, the illustrated clips 163 comprise resilient upper and lower clip legs 167 configured such that when the rounded arm 120 contacts the clip 163, the clip legs 167 are forced correspondingly up and down such that the arm 120 can move into upper and lower grooves 169 in the upper and lower clip legs 167 and such that the legs 167 then move together to maintain the arm 120 in the grooves 169.

The clips 163 are oriented on the clip bracket 161 so that when the arms 120A, 120B are engaged in their corresponding clips 163A, 163B, the rotor pairs 110 will be in their desired positions equally spaced about the central axis CA.

In this folded position the aircraft 100 can be launched from a launching mechanism such as a pneumatic cannon, etc. into the air to achieve an initial altitude. From this initial altitude, the front arms 120A, 120B can be rotated forward into their flying position, the rotor pairs 110 engaged so that the upper rotors 210 and lower rotors 220 are rotating, and the aircraft 100 can then be flown starting from this initial altitude the aircraft 100 has been launched to.

The front arms 120A, 120B could be motor driven so that a small motor pivots the front arms 120A, 120B forward into the flying position. Alternatively, in the mechanism illustrated in FIGS. 8-11 the front arms 120A, 120B can be biased towards the front of the aircraft 100 and the flying position, such as by coil springs 171 wrapped around the pivot pins pivotally attaching the front arms 120 A, 120B to the pivot bracket 165. In this manner, the front arms 120A, 120B can be held adjacent to the rearward extending arm 120C in the launching mechanism, and once the front arms 120A, 120B are freed from the launching mechanism the bias force would push the front arms 120A, 120B forward into engagement with the clips 163 and in their flying position allowing the aircraft 100 to begin to fly using the rotor pairs 110.

In this manner, aircraft 100 can be quickly launched to a desired altitude over a desired area and then once in the flying position flown like a helicopter. Alternatively where no launcher is being used, the front arms 120A, 120B could still be biased and held in the folded position by a retainer, such that releasing the retainer will cause the front arms 120A, 120B to move automatically to the flying position.

Figure 13:
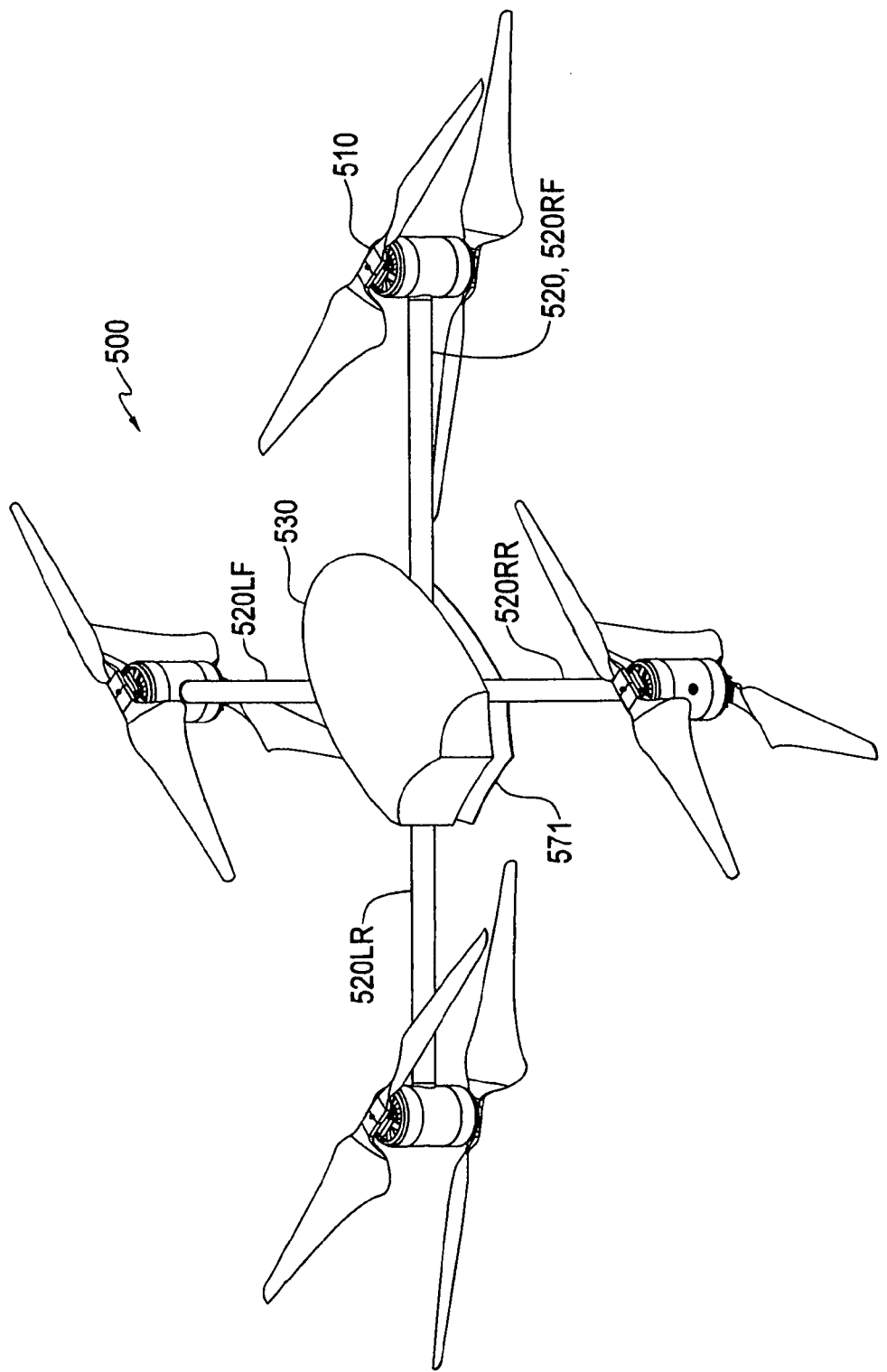
FIG. 13 is a perspective rear view of an alternate aircraft with four arms and rotor pairs in the flying position.
Figure 14:
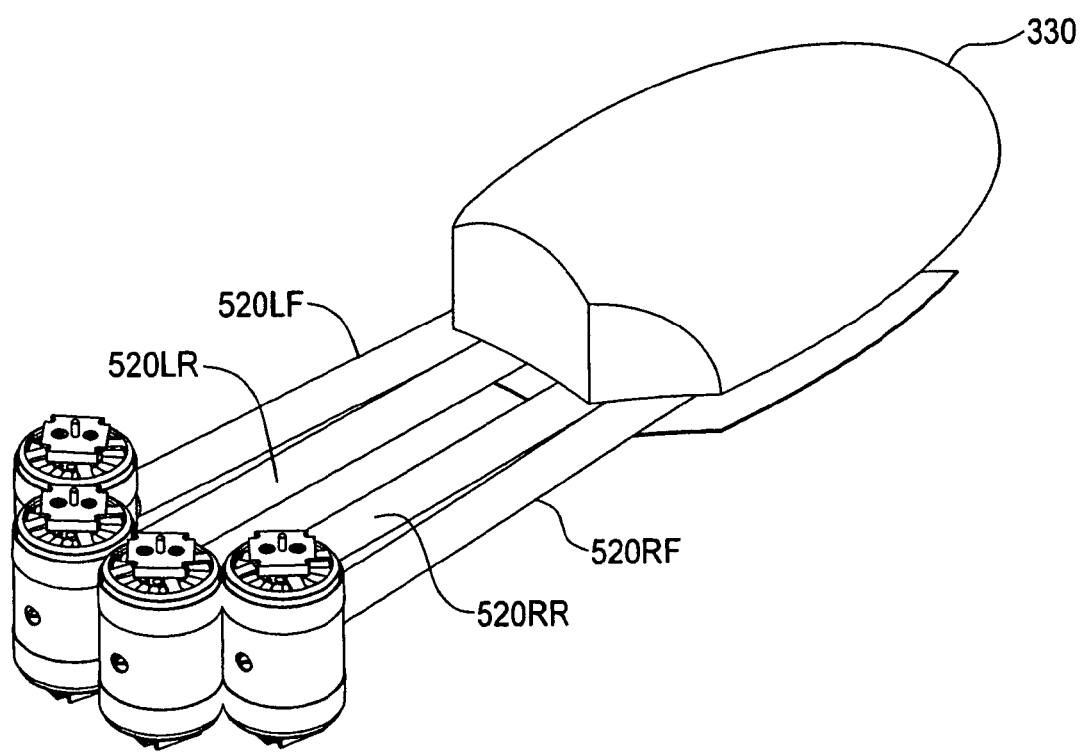
FIG. 14 is a perspective rear view of the aircraft of FIG. 13 in the folded position.
Figure 15:
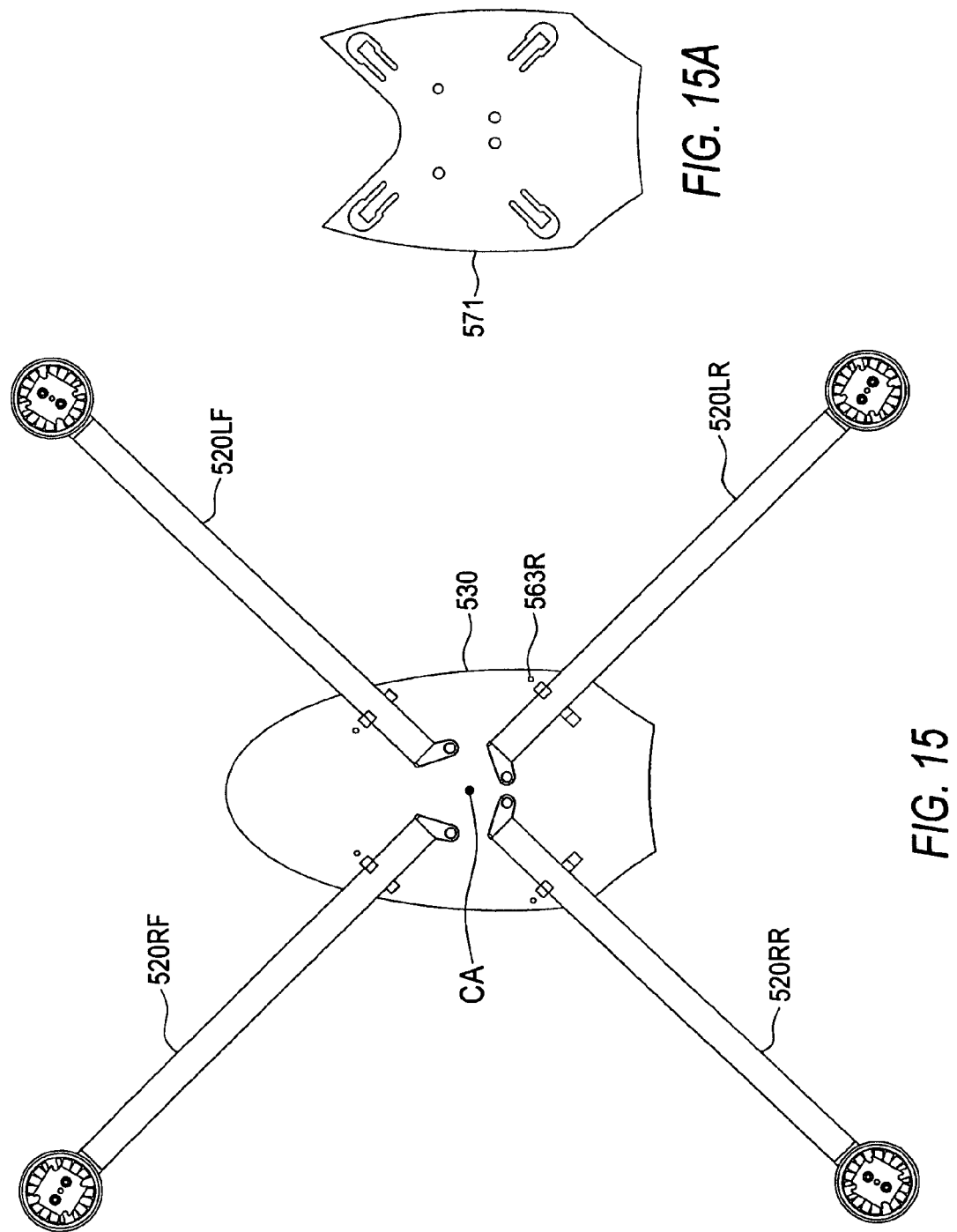
FIG. 15 is a bottom view of the aircraft of FIG. 13 in the flying position with the bottom plate removed.
Figures 16, 16A:
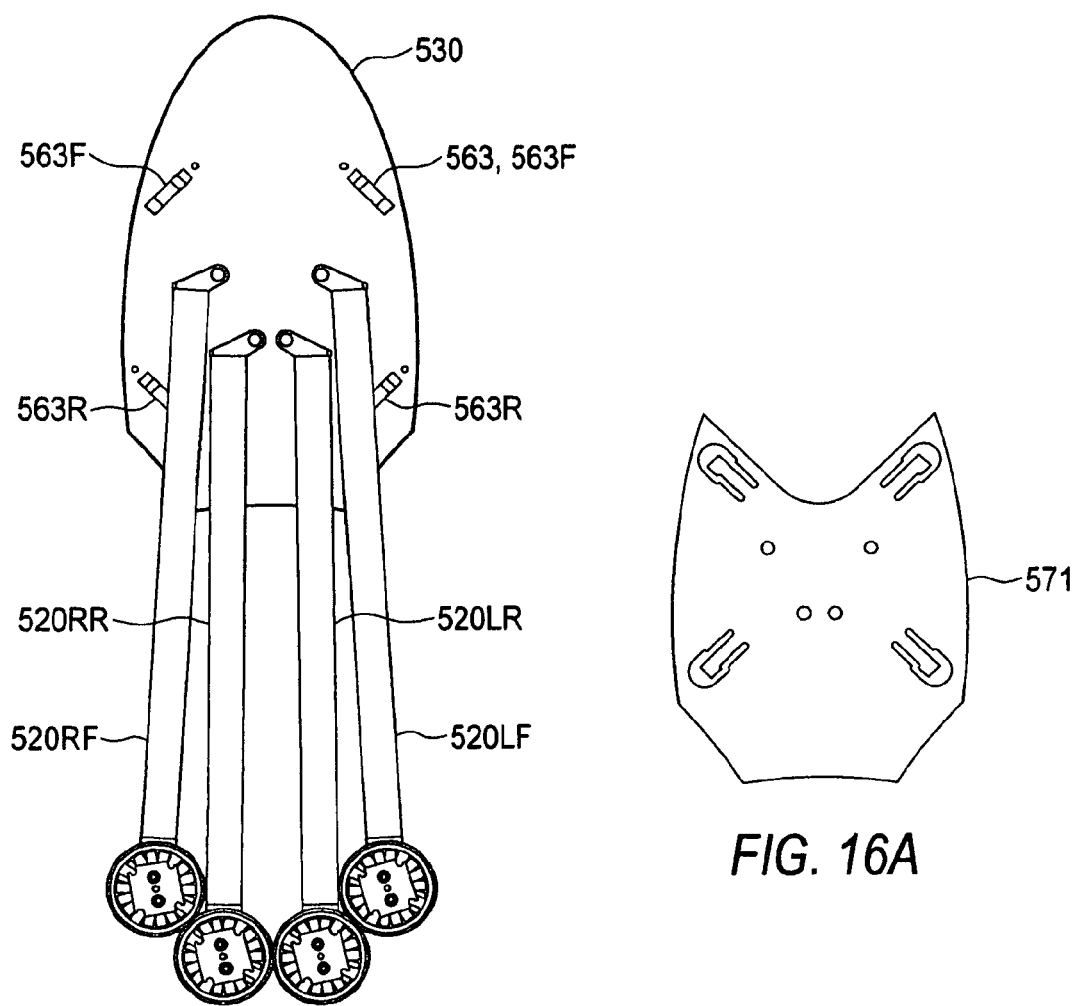
FIG. 16 is a bottom view of the aircraft of FIG. 13 in the folded position with the bottom plate removed.

FIGS. 13-16 illustrate an alternate embodiment of the folding arm aircraft 500 comprising four rotor pairs 510, each rotor pair 510 attached to the body 530 by an arm 520. Each arm 520 is positioned approximately ninety degrees around a central axis CA from an arm 520 supporting an adjacent rotor pair 510. Right and left front arms 520RF, 520LF extend forward and to sides of the body 530 and right and left rear arms 520RR, 520LR extends rearward and to sides of the body 530 when the aircraft is in a flying position as illustrated in FIGS. 13 and 15. In this aircraft with four arms, all arms 520 are pivotally attached to the body 530 such that the right and left rear arms 520RR, 520LR can be pivoted rearward to a folded position extending rearward, and then the right and left front arms 520RF, 520LF can be pivoted rearward to a folded position extending rearward with one front arm on each side of the folded rear arms 520RR, 520LR and substantially parallel to and adjacent to the rear arms 520RR, 520LR as illustrated in FIGS. 14 and 16.

As can be seen in the bottom view of the body 530 with the bottom plate 571 removed in FIG. 15, the right and left rear arms 520RR, 520LR are pivotally mounted to the body at rear pivot locations RPA adjacent to each other, and the right and left front arms 520RF, 520LF are pivotally mounted to the body at front pivot locations FPA forward of and laterally spaced from the rear pivot locations RPA.

As can be seen in FIG. 15, the arms 520 engage clips 563 mounted to the body 530 to keep the arms 520 in the flying position. The front clips 563F can be fixed to the body 530 however the rear clips 563R must be moved up into the body 530 so that the front arms can move rearward past the rear clips 563R as shown in FIG. 16. The clips 563r can be moved manually, or could also be biased downward so that when the front arm 520F is folded back it forces the rear clip 563R up into the body 530. It is contemplated that numerous other clip configurations or like mechanisms could be used as well. Since the aircraft are relatively light, and the forces exerted by the rotors 510 is relatively small, it is also contemplated that the arms 520 could bear against the body 530 and the bottom plate 571 such that friction of the arms 520 between the body 530 and bottom plate 571 prevents movement of the arms 520 during operation but allows manual movement of the arms between the flying and folded positions.

Such rotary wing aircraft with pairs of upper and lower rotors connected to the aircraft by a lateral arm can be beneficially used for surveillance. A camera can be mounted to the bottom of the body 130 with images stored or sent by wireless transmission to a receiver. The lower rotor 220 can interfere with the camera view downward and laterally, decreasing the available camera viewing angle. For this reason it is desirable to have the upper and lower rotors 210, 220 as vertically close together as possible. Since the rotor blades 230 are somewhat flexible, they bend and flex as air and power conditions vary. It is therefore not possible to mount the rotor blades 230 very close to the arm 120, as the blades must be kept a sufficient distance above and below the arm 120 to avoid contact with the arm 120.

Figure 12:
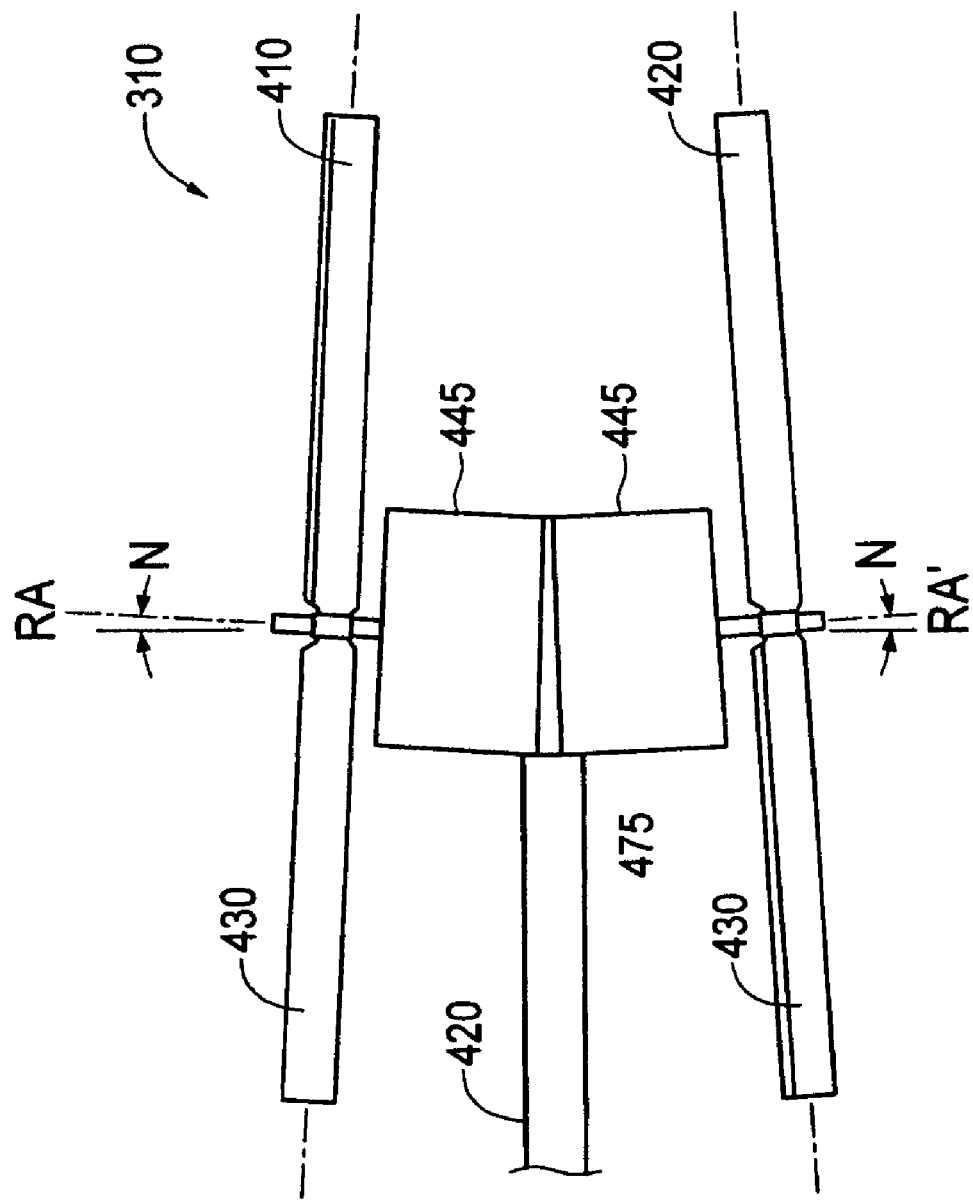
FIG. 12 is a side view of an alternate rotor pair of the present invention where the upper and lower rotor axes are tilted away from the arm.

In the rotor pair 110 illustrated in FIG. 4 above, the upper and lower rotors 210, 220 rotated about a common axis RA, which axis was perpendicular to the arm 120. FIG. 12 illustrates an alternate rotor pair 310 connected to an aircraft body as above by an arm 420. Each rotor pair comprises an upper rotor 410 driven by an upper motor 445 and rotating about an upper rotor axis RA and a lower rotor 420 driven by a lower motor 445 and rotating about a lower rotor axis RA' that is not aligned with the upper rotor axis RA. Unlike the rotor pair 110 of FIG. 4, in the rotor pair of FIG. 12 the upper and lower rotor axes RA, RA' are tilted with respect to each other. The axes RA, RA' both tilt away from the arm 120 such that outer ends of blades 430 of the upper rotor 410 are farthest away from blades 430 of the lower rotor 420 when they pass the arm 120.

Thus the outer ends of the rotor blades 430 are raised with respect to the arm 420 and are farther away from the arm 120 than in the embodiment shown in FIG. 4, and somewhat closer together in the portion of the rotation opposite the arm 120, where there is no arm to interfere with the blades. A small tilt angle N can move the blades sufficiently, and the angle N must not be so large that there is a risk the upper and lower blades will touch in the portion of the rotation opposite the arm 120.

Since the upper and lower rotor blades are driven in opposite directions by separate motors 445, it is only required to provide a wedge shaped mounting member 475 between the upper and lower motors 445 to achieve the required tilt. It is contemplated that any helicopter with upper and lower rotor blades mounted on an arm could benefit from the tilted rotor axis arrangement of FIG. 12 to reduce the risk of contact between the blades and the arm. The blades are quite light and tend to flex when exerting lifting forces as they rotate through the air. This force causes the blades to flex in response, such that the blades can contact the arm. It is also known to mount the rotor blade to the motor shaft about a horizontal pivot axis oriented perpendicular to the axis of the blade so the blade can rock. This configuration can reduce vibration, but also increases the risk of the blade contacting the arm. Tilting the rotor blades away from the arm as in the present invention reduces the risk of such contact.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A rotary wing aircraft apparatus comprising:
a body;
an arm connected to the body at a first end thereof and a rotor pair connected to an opposite second end of the arm;
the rotor pair comprising an upper rotor driven by an upper motor and rotating about an upper rotor axis and a lower rotor driven by a lower motor and rotating about a lower rotor axis;
wherein the upper and lower rotor axes are tilted with respect to each other.

2. The apparatus of claim 1 wherein the axes tilt away from the arm such that outer ends of blades of the upper rotor are farthest away from blades of the lower rotor when they pass the arm.

3. The apparatus of claim 2 comprising three rotor pairs, and each rotor pair attached to the body by an arm, each arm positioned so the rotor pairs are positioned substantially at the corners of an equilateral triangle.

4. The apparatus of claim 3 wherein right and left front arms extend to the sides of the body and a rear arm extends rearward from the body when the apparatus is in a flying position.

5. The apparatus of claim 4 wherein the right and left front arms are pivotally connected to the body such that the right and left front arms can be pivoted rearward to a folded position where the right and left side arms are positioned substantially parallel to and adjacent to the rear arm.

6. The apparatus of claim 5 wherein the right and left front arms are biased towards the flying position and a retainer is used to hold the right and left arms in place in the folded position.

7. The apparatus of claim 5 comprising a clip bracket extending laterally right and left from a front end of the rear arm, and right and left clips on corresponding right and left ends of the clip bracket, and wherein the clip bracket is configured such that the right and left front arms are releasably engaged in the corresponding right and left clips when in the flying position.

8. The apparatus of claim 7 comprising a pivot extending laterally from the rear arm at a location removed from the rear end of the rear arm, and wherein the right and left front arms are pivotally attached to corresponding right and left portions of the pivot bracket.

9. The apparatus of claim 7 wherein the clips comprise resilient upper and lower clip legs configured such that when the rounded arm contacts the clip the clip legs are forced correspondingly up and down such that the arm can move into upper and lower grooves in the upper and lower clip legs and such that the legs then move together to maintain the arm in the grooves.

10. The apparatus of claim 2 comprising four rotor pairs, and each rotor pair attached to the body by an arm, each arm positioned approximately ninety degrees around a central axis from an arm supporting an adjacent rotor pair.

11. The apparatus of claim 10 wherein right and left front arms extend forward and to sides of the body and right and left rear arm extends rearward and to sides of the body when the apparatus is in a flying position.

12. The apparatus of claim 11 wherein the right and left front and rear arms are pivotally connected to the body such that the right and left rear arms can be pivoted rearward to a folded position extending rearward, and the right and left front arms can be pivoted rearward to a folded position extending rearward with one front arm on each side of the folded rear arms and substantially parallel to and adjacent to the rear arms.

13. The apparatus of claim 12 wherein the right and left rear arms are pivotally mounted to the body at rear pivot locations adjacent to each other, and the right and left front arms are pivotally mounted to the body at front pivot locations forward of and laterally spaced from the rear pivot locations.

14. A rotary wing aircraft apparatus comprising:
a body;
a plurality of arms extending laterally from the body and a rotor pair connected to an opposite second end of the arm, and a rotor assembly connected to an outside end of each arm, the rotor pair comprising an upper rotor rotating about an upper rotor axis and a lower rotor rotating about a lower rotor axis;
wherein the arms are connected to the body such that the arms can be pivoted from a flying position, where the arms extend laterally outward from the body such that the rotor assemblies are spaced in a desired configuration, to a folded position where the arms are positioned substantially parallel and laterally adjacent to each other in substantially the same plane; and
at least three rotor assemblies each attached to the body by an arm, each arm positioned so the rotor assemblies are positioned substantially at the corners of an equilateral triangle, and a clip bracket extending laterally right and left from a front end of a rear arm, and right and left clips on corresponding right and left ends of the clip bracket, wherein the clip bracket is configured such that right and left front arms are releasably engaged in the corresponding right and left clips when in the flying position.

15. The apparatus of claim 14 wherein right and left front arms extend to the sides of the body and a rear arm extends rearward from the body when the apparatus is in a flying position.

16. The apparatus of claim 15 wherein the right and left front arms are pivotally connected to the body such that the right and left front arms can be pivoted rearward to a folded position where the right and left side arms are positioned substantially parallel to and adjacent to the rear arm.

17. The apparatus of claim 16 wherein the right and left front arms are biased towards the flying position and a retainer is used to hold the right and left arms in place in the folded position.

18. The apparatus of claim 14 comprising a pivot bracket extending laterally from the rear arm at a location removed from the rear end of the rear arm, and wherein the right and left front arms are pivotally attached to corresponding right and left portions of the pivot bracket.

19. The apparatus of claim 14 wherein the clips comprise resilient upper and lower clip legs configured such that when the rounded arm contacts the clip the clip legs are forced correspondingly up and down such that the arm can move into upper and lower grooves in the upper and lower clip legs and such that the legs then move together to maintain the arm in the grooves.

20. A rotary wing aircraft apparatus comprising:
a body;
a plurality of arms extending laterally from the body, and a rotor assembly connected to an outside end of each arm;
wherein the arms are connected to the body such that the arms can be pivoted from a flying position, where the arms extend laterally outward from the body such that the rotor assemblies are spaced in a desired configuration, to a folded position where the arms are positioned substantially parallel and laterally adjacent to each other in substantially the same plane;
four rotor assemblies, each rotor assembly attached to the body by an arm, each arm positioned approximately ninety degrees around a central axis from an arm supporting an adjacent rotor assembly;
wherein right and left front arms extend forward and to sides of the body and right and left rear arm extends rearward and to sides of the body when the apparatus is in a flying position; and
wherein the right and left front and rear arms are pivotally connected to the body such that the right and left rear arms can be pivoted rearward to a folded position extending rearward, and the right and left front arms can be pivoted rearward to a folded position extending rearward with one front arm on each side of the folded rear arms and substantially parallel to and adjacent to the rear arms.

21. The apparatus of claim 20 wherein the right and left rear arms are pivotally mounted to the body at rear pivot locations adjacent to each other, and the right and left front arms are pivotally mounted to the body at front pivot locations forward of and laterally spaced from the rear pivot locations.

* * * * *